United States Patent [19]

Harada

[11] Patent Number: 5,614,657

[45] Date of Patent: Mar. 25, 1997

[54] THREE DIMENSIONALLY MEASURING APPARATUS

[76] Inventor: Shintaro Harada, 73-2, Nakaawahara, Kumami-Choo, Nishio-City, Aichi-Pref., Japan

[21] Appl. No.: 351,526

[22] Filed: Dec. 7, 1994

[51] Int. Cl.$^6$ ............................................. G01M 7/00
[52] U.S. Cl. ..................... 73/12.11; 73/12.09; 102/513
[58] Field of Search ........................ 73/11.02, 12.04, 73/12.05, 12.09, 12.11; 102/293, 502, 513; 364/506, 507, 552

[56] References Cited

U.S. PATENT DOCUMENTS

| | | | |
|---|---|---|---|
| 2,214,359 | 9/1940 | Woodford et al. | 102/513 |
| 3,709,026 | 1/1973 | Rhodes et al. | 73/12.11 |
| 3,788,466 | 1/1974 | Wilson et al. | 73/12.09 X |
| 3,865,038 | 2/1975 | Barr | 102/502 |
| 3,901,158 | 8/1975 | Ferb | 102/502 X |
| 4,028,934 | 6/1977 | Sollish | 73/603 X |
| 4,237,787 | 12/1980 | Wawa et al. | 102/513 |
| 4,495,870 | 1/1985 | Bell | 102/513 X |
| 4,594,662 | 6/1986 | Devaney | 364/400 |
| 4,656,092 | 4/1987 | Hamam et al. | 102/513 X |
| 4,672,897 | 6/1987 | Betts | 102/513 |
| 4,798,210 | 1/1989 | Ledley | 73/619 X |
| 4,896,278 | 1/1990 | Grove | 364/552 |
| 4,918,988 | 4/1990 | Ebihara et al. | 73/12.09 X |
| 4,976,149 | 12/1990 | Ichikawa et al. | 73/622 X |
| 4,982,375 | 1/1991 | Ng | 367/135 |
| 5,035,183 | 7/1991 | Luyton | 102/513 X |
| 5,235,857 | 8/1993 | Anderson | 73/626 X |
| 5,363,050 | 11/1994 | Guo et al. | 324/638 |
| 5,370,056 | 12/1994 | Huang | 102/502 X |
| 5,375,529 | 12/1994 | Knight, Jr. et al. | 102/502 X |
| 5,402,364 | 3/1995 | Kitoh et al. | 364/560 |

*Primary Examiner*—Richard Chilcot
*Assistant Examiner*—Elizabeth L. Dougherty

[57] ABSTRACT

A three dimensionally measuring apparatus includes a gun, a pedestal of the gun, three microphones, a pedestal of a product and a data processor. The gun shoots very small bullets at a target such as a casting product. The very small bullets explode or rupture and high frequency sound at the time of hitting against the target. The three microphones catch the high frequency sounds. All these sound data are gathered to the data processor, and processed into three dimensional data of the surface of the product.

5 Claims, 3 Drawing Sheets

THREE DIMENSIONALLY MEASURING APPARATUS

BACKGROUND OF THE INVENTION

1. Field of the Invention

This invention relates generally to a three dimensionally measuring apparatus, and more particularly to a three dimensionally measuring apparatus for casting products.

2. Description of the Prior Art

A three dimensionally measuring apparatus consists of complex machinery, and takes many measuring time, and is large, heavy and expensive.

SUMMARY OF THE INVENTION

It is therefore an object of the invention to provide an improved three dimensionally measuring apparatus which obviates the above conventional drawbacks.

According to the invention, a three dimensionally measuring apparatus comprising a gun, a pedestal of the gun, three microphones, a pedestal of a product and a data processor. The gun shoots very small bullets at a target such as a casting product. The very small bullets explode or rupture and occure high frequency sounds at the time of hitting against the target. The three microphones catch the sounds. All these sound data are gathered to the data processor, and processed into three dimensional data of the surface of the product.

BRIEF DESCRIPTION OF THE DRAWINGS

Further objects and features of the present invention will be understood more clearly from the following detailed description of the embodiments thereof, when read with reference of the drawings in which.

DETAILED DESCRIPTION OF THE INVENTION

Figure 1:
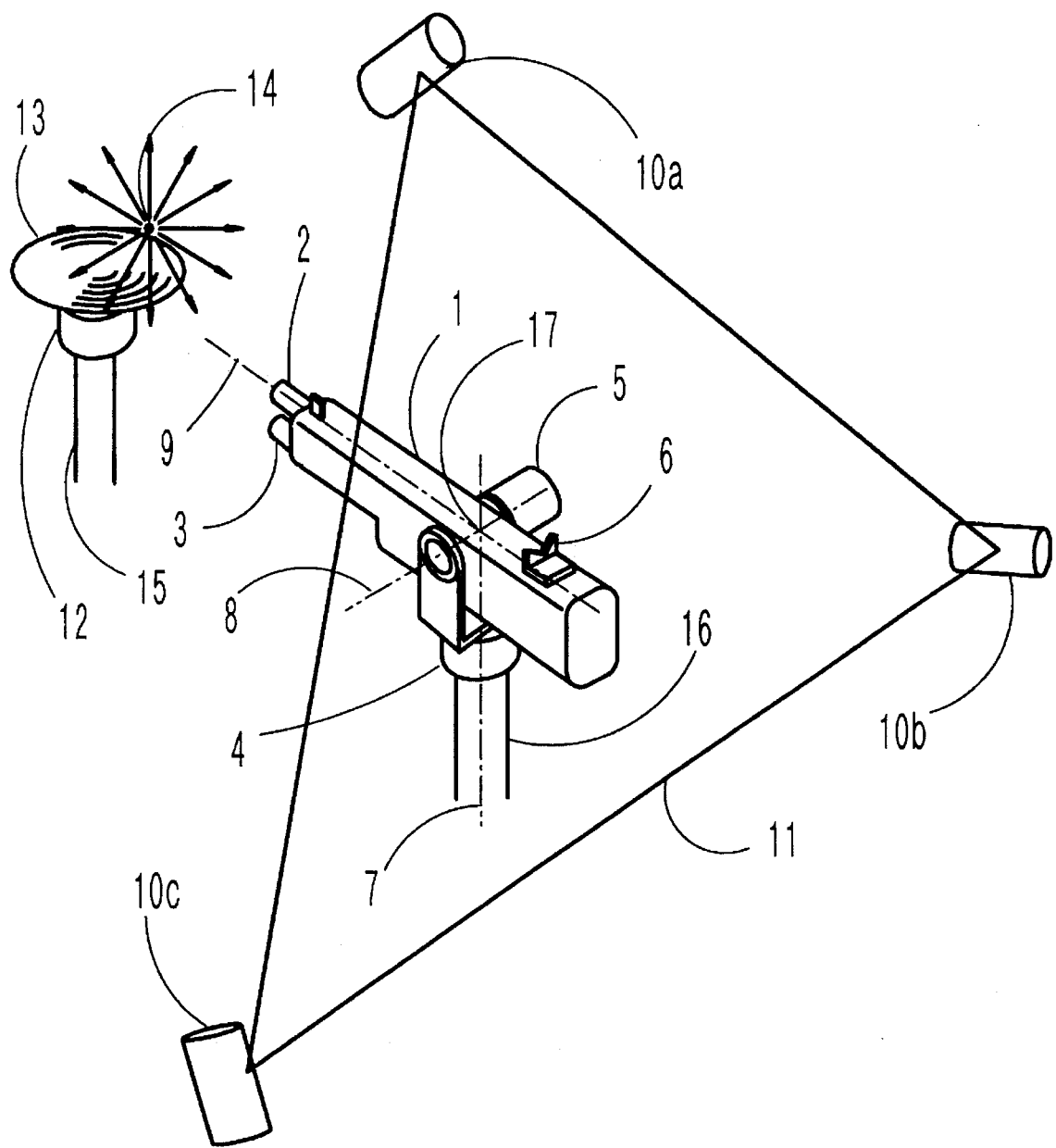
FIG. 1 shows a solid view of the three dimensionally measuring apparatus according to the invention.

In FIG. 1, a gun 1 has a muzzle 2, a sight 6 and an electric light 3. A pedestal 16 of the gun 1 has a control motor 4 turning at a vertical axis 7 and another control motor 5 turning at a horizontal axis 8 crossing with the vertical axis 7 at the cross point 17. An axis 9 of the muzzle 2 has the same cross point 17. An electric light 3 has an axis parallel to the axis 9. The pedestal 15 of the product having a control motor 12 supports and turns a product 13. A very small bullet 14 is shot by the gun 1, and exploded or ruptured and sounds at the surface of the product 13. Three microphones 10a, 10b, 10c are disposed at the points being three vertexes of a triangle 11.

Figure 2:
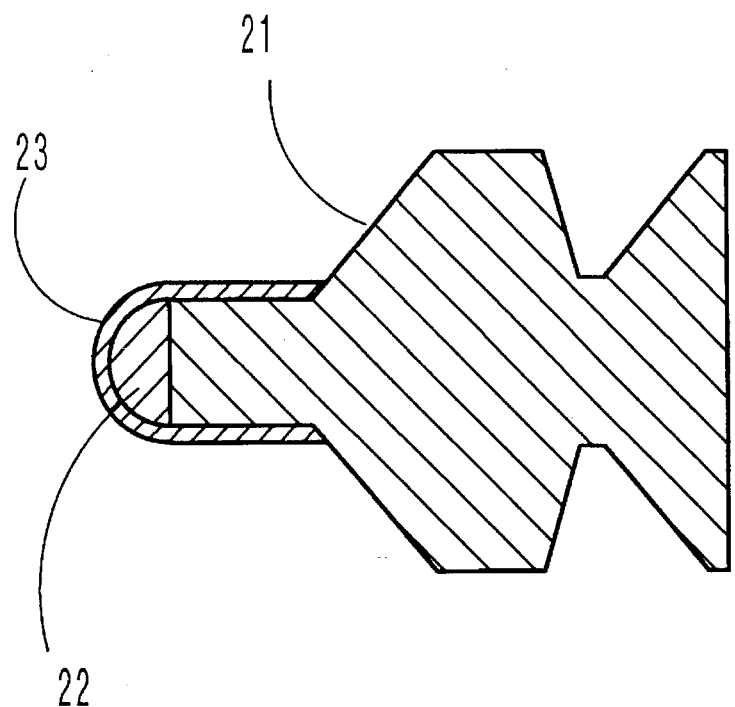
FIG. 2 shows a cross-sectional view of a small bullet of the invention.

In FIG. 2, a bullet 21 has a thin column on its tip. The gunpowder 22 shaped like a hemisphere is disposed on the tip of the thin column, and covered by a thin film 23.

Figure 3:
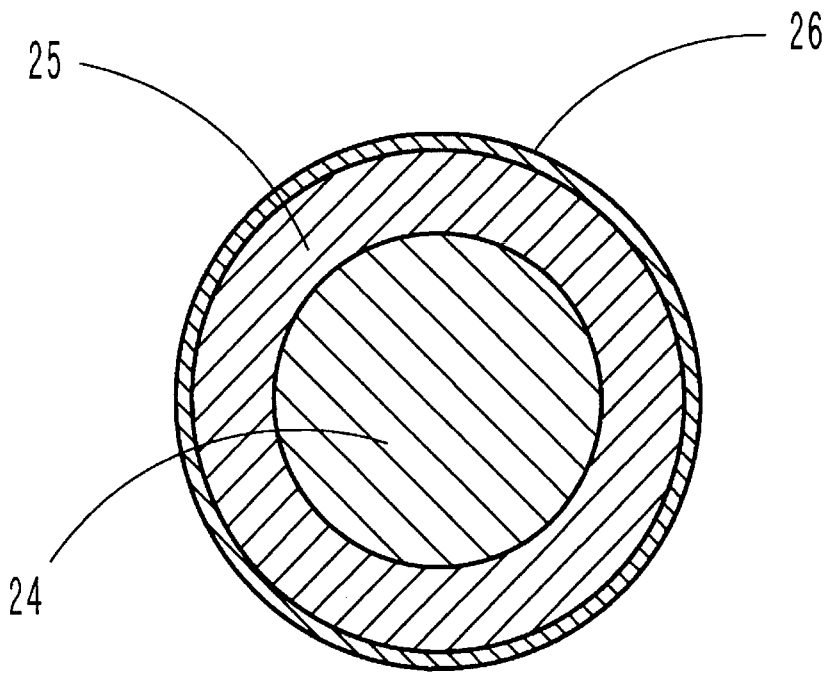
FIG. 3 shows a cross-sectional view of another small shell of the invention.

In FIG. 3 a shell consists of a spherical nucleus 24 made of metal, gunpowder 25 encircling the spherical nucleus 24 and a thin film 26 encircling the gunpowder 25.

Figure 4:
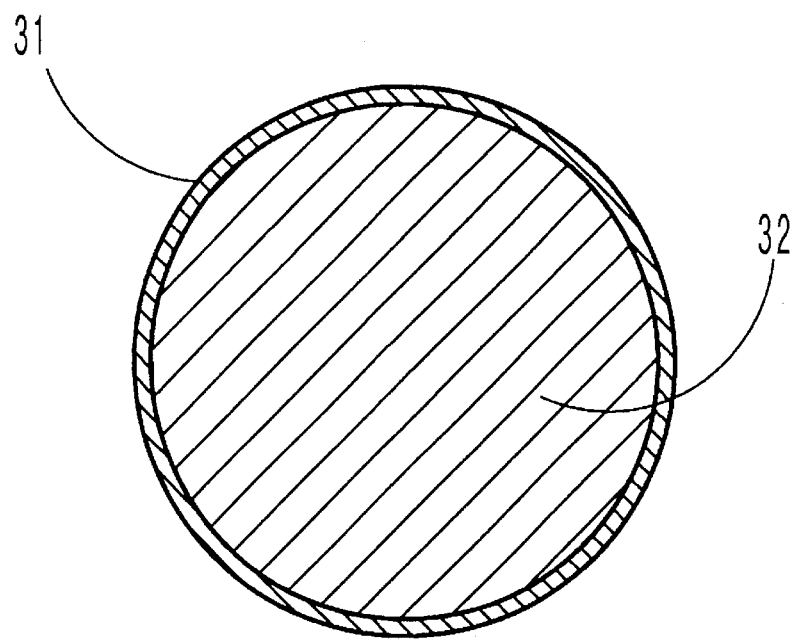
FIG. 4 shows a cross-sectional view of another small shell of the invention.

In FIG. 4, a spherical nucleus 32 made of gunpowder is encircled by a thin film 31.

Figure 5:
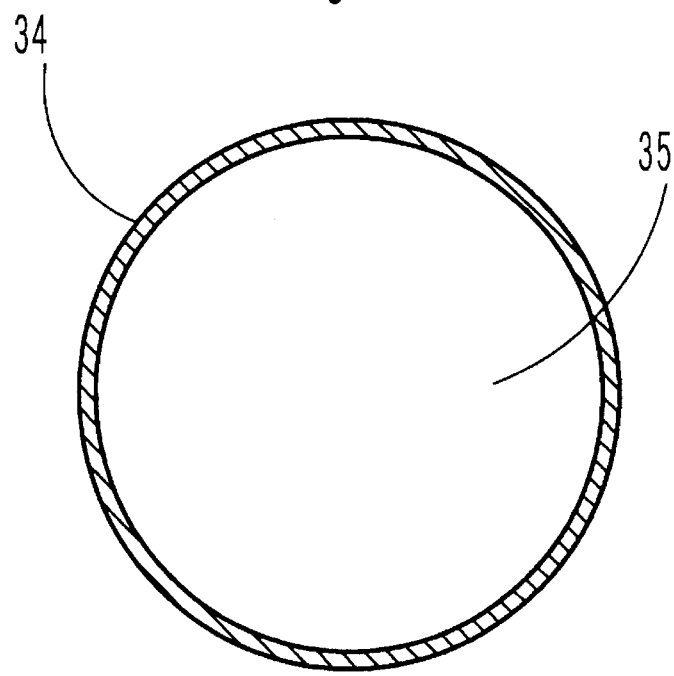
FIG. 5 shows a cross-sectional view of another small shell of the invention.

In FIG. 5, a small bubble 34 made of thin film is filled with pressurized gas.

Operation

When the product 13 supported by the pedestal 15 is aimed by the sight 2 or the electric light 3 of the gun 1, and is shot with the bullet 14 by the gun 1, the bullet 14 hits the surface of the product 13, and explodes or ruptures and sounds at the pin-point on the surface. The sound data caught by three microphones 10a, 10b, 10c at the same time are sent to the data processor, and memorized. In the next place, the position aimed by the gun 1 is shifted a little automatically by both control motors 4, 5, and shot with another bullet 14 by the gun 1. After the above same process completed, the sound data are sent to the data processor and memorized too. This shooting process repeats until all points of the surface of the product are shot completely. And then the product 13 is turned at an appropriate angle by a control motor 12. In the next place, above full shooting process are completed. The distance between the pin-point on the surface of product 13 and each microphone 10a, 10b, 10c is computed from memorized sound data by the data processor, and the three dimensional data of the surface of the product 13 are computed from these distances and the three distances among the microphones which are measured previously.

What is claimed is:

1. A three dimensional measuring apparatus comprising:

a gun shooting a very small ballistic means;

a first pedestal for turning gun, the first pedestal having a vertical axis control and a horizontal axis control motor;

a second pedestal for turning a product to be measured, the second pedestal having a vertical control axis motor;

three or more microphones disposed at vertexes of a polygon, said microphones for gathering the high frequency sound data occurring by explosion or rupture of said very small ballistic means on the surface of the product;

a data processor for controlling said gun and said first and second pedestal control motors, for calculating distances between said microphones and said product from the sound data sent from said microphones, and for showing the three dimensional data of the surface of the product.

2. Three dimensional measuring apparatus according to claim 1, wherein said ballistic means has a thin column on its tip;

a hemisphere of gunpowder disposed on said tip of the thin column, and is covered by a thin film.

3. Three dimensional measuring apparatus according to claim 1, wherein said ballistic means consists of a spherical nucleus made of metal, gunpowder encircling said spherical nucleus and a thin film encircling said gunpowder.

4. Three dimensional measuring apparatus according to claim 1, wherein said ballistic means consists of a spherical nucleus, made of gunpowder encircled by a thin film.

5. Three dimensional measuring apparatus according to claim 1, wherein said ballistic means consists of a small bubble of thin film filled with pressurized gas.

* * * * *